(12) United States Patent
Jiang

(10) Patent No.: US 7,484,000 B2
(45) Date of Patent: Jan. 27, 2009

(54) STALL AVOIDANCE SCHEMES USING HARQ PROCESS RECEIVING STATUS

(75) Inventor: Sam Shiaw-Shiang Jiang, Hsinchu (TW)

(73) Assignee: Innovative Sonic Limited, Tortola (VG)

( * ) Notice: Subject to any disclaimer, the term of this patent is extended or adjusted under 35 U.S.C. 154(b) by 687 days.

(21) Appl. No.: 10/355,481

(22) Filed: Jan. 31, 2003

(65) Prior Publication Data

US 2003/0147348 A1      Aug. 7, 2003

Related U.S. Application Data

(60) Provisional application No. 60/353,389, filed on Feb. 1, 2002, provisional application No. 60/383,655, filed on May 28, 2002, provisional application No. 60/390,969, filed on Jun. 24, 2002.

(51) Int. Cl.
    *G06F 15/173* (2006.01)
(52) U.S. Cl. .................. 709/240; 370/229; 370/412
(58) Field of Classification Search ................. 370/229, 370/412
    See application file for complete search history.

(56) References Cited

U.S. PATENT DOCUMENTS

| | | | | |
|---|---|---|---|---|
| 6,359,895 | B1* | 3/2002 | Yamanaka | 370/408 |
| 6,901,063 | B2* | 5/2005 | Vayanos et al. | 370/335 |
| 2002/0172208 | A1* | 11/2002 | Malkamaki | 370/400 |
| 2002/0191544 | A1* | 12/2002 | Cheng et al. | 370/236 |
| 2003/0169741 | A1* | 9/2003 | Torsner et al. | 370/394 |
| 2005/0073978 | A1* | 4/2005 | Kim et al. | 370/335 |
| 2006/0092973 | A1* | 5/2006 | Petrovic et al. | 370/469 |

OTHER PUBLICATIONS

3GPP TR 25.855 V2.0.0, Sep. 2001, Technical Specification Group Radio Access Network: High-speed Downlink Packet Access.*
Non-Patent Literature Publication 3GPP TR 25.855 V2.0 (Sep. 2001).*
3rd Generation Partnership Project; Technical Specification Group Radio Access Network; MAC Protocol specification (Release 5) 3GPP TS 25.321 V.5.0.0 (Mar. 2002).
3rd Generation Partnership Project; Technical Specification Group Radio Access Network; High Speed Downlink Packet Access (HSDPA) Overall Description (Release 5) TS 25.308 v5.10.
3rd Generation Partnership Project; Technical Specification Group Radio Access Network; High Speed Downlink Packet Access (HSDPA) Overall Description (Release 5) TS 25.308 v5.2.0.

* cited by examiner

*Primary Examiner*—John Follansbee
*Assistant Examiner*—Glenford Madamba
(74) *Attorney, Agent, or Firm*—Winston Hsu

(57) ABSTRACT

This invention employs a quicker reordering buffer gap removing and buffered data block delivery method. The invention uses several parameters to support its operation. One of the pertinent parameters is a New Data Indicator, another is an array variable, TTI-States, to track at least n consecutive data block receiving statues of TTIs of the n active HARQ processes of the HARQ entity at the receiver side.

1 Claim, 4 Drawing Sheets

| | 10 | 12 | 14 | 16 | 18 | 20 |
|---|---|---|---|---|---|---|
| HARQ Process ID | Cycle 1 TSN, Status | Cycle 2 TSN, Status | Cycle 3 TSN, Status | Cycle 4 TSN, Status | Cycle 5 TSN, Status | Cycle 6 TSN, Status |
| a | B0, N:A | B4, A | A0, N | A0, A:N | A0, A | B9, A |
| b | B1, A | B5, N | A1, A | A4, N | A4, A | B10, A |
| c | B2, | B2, A | A2, N:A | | B7, N | B7, A |
| d | B3, A | B6, A | A3, A | | B8, A | |

|  | 10 | 12 | 14 | 16 | 18 | 20 |
|---|---|---|---|---|---|---|
| HARQ Process ID | Cycle 1 TSN, Status | Cycle 2 TSN, Status | Cycle 3 TSN, Status | Cycle 4 TSN, Status | Cycle 5 TSN, Status | Cycle 6 TSN, Status |
| a | B0, N:A | B4, A | A0, N | A0, A:N | A0, A | B9, A |
| b | B1, A | B5, N | A1, A | A4, N | A4, A | B10, A |
| c | B2, | B2, A | A2, N:A |  | B7, N | B7, A |
| d | B3, A | B6, A | A3, A |  | B8, A |  |

Figure 1

|  | Cycle | HARQ Process ID | Previous n consecutive HARQ states |  | Queue B | Queue A |
|---|---|---|---|---|---|---|
| 22 | 3 | b | XXYZ | Received TSN | 1 2 3 4 6 | 1 |
|  |  |  |  | Delivered to upper layer | 1 2 3 4 6 |  |
| 24 | 6 | c | XXXX | Received TSN | 7 8 9 10 | 0 1 _ 3 4 |
|  |  |  |  | Delivered to upper layer | 7 8 9 10 | 0 1 3 4 |

Figure 2

|  | 26 | 28 | 30 | 32 | 34 | 36 |
|---|---|---|---|---|---|---|
| HARQ Process ID | Cycle 1 TSN, Status | Cycle 2 TSN, Status | Cycle 3 TSN, Status | Cycle 4 TSN, Status | Cycle 5 TSN, Status | Cycle 6 TSN, Status |
| a | B0, N:A | B4, A | A0, N:A | A4, N | A4, A | B6, A |
| b | B1, A | B5, N | A1, A | A5, N | A5, A | B7, A |
| c | B2, N | B2, A | A2, N:A |  | B3, N | B3, A |
| d | B3, N | B3, N | A3, A |  | B5, A |  |

Figure 3

| | Cycle | HARQ Process ID | Previous n consecutive states | | Queue B | Queue A |
|---|---|---|---|---|---|---|
| 40 | 4 | a | XYZY | Received TSN | 1 2 _ 4 | _ 1 _ 3 |
| | | | | Delivered to upper layer | | 1 |
| 42 | 6 | c | XXXX (of Queue B) | Received TSN | 1 2 3 4 5 6 7 | 3 4 5 |
| | | | | Delivered to upper layer | 1 2 3 4 5 6 7 | 3 4 5 |

Figure 4

| HARQ Process ID | Cycle 1 TSN, Status | Cycle 2 TSN, Status | Cycle 3 TSN, Status | Cycle 4 TSN, Status | Cycle 5 TSN, Status | Cycle 6 TSN, Status |
|---|---|---|---|---|---|---|
| a | B0, N:A | | B2, A | | | A0, A |
| b | B1, N | | B1, N | B1, A | | A1, A |
| c | | | | B3, N:A | B5, A | |
| d | | | | B4, N | B4, A | |

Figure 5

| | Cycle | HARQ Process ID | | Queue B | Queue A |
|---|---|---|---|---|---|
| 56 | 3 | a | Received TSN | _ 2 | |
| | | | Delivered to upper layer | N/A | |
| 58 | 5 | c | Received TSN | 1 2 _ _ 5 | |
| | | | Delivered to upper layer | N/A | |
| 60 | 5 | d | Received TSN | 1 2 _ 4 5 | |
| | | | Delivered to upper layer | 1 2 | |
| 62 | 6 | b | Received TSN | _ _ _ 4 5 | 0 1 |
| | | | Delivered to upper layer | 4 5 | 0 1 |

Figure 6

|                | 64            | 66            | 68            | 70            | 72            | 74            |
|                | Cycle 1       | Cycle 2       | Cycle 3       | Cycle 4       | Cycle 5       | Cycle 6       |
| HARQ Process ID | TSN, Status   | TSN, Status   | TSN, Status   | TSN, Status   | TSN, Status   | TSN, Status   |
| a              | B0, N:A       | B4, A         | A0, N:A       | A4, N         | A4, A         | B6, A         |
| b              | B1, A         | B5, N         | A1, A         | A5, N         | A5, A         | B7, A         |
| c              | B2, N         | B2, N:A       | A2, N:A       |               | B3, A         |               |
| d              | B3, N         | B3, N         | A3, A         |               | B5, A         |               |

Figure 7

|    | Cycle | HARQ Process ID |                        | Queue B   | Queue A  |
|----|-------|-----------------|------------------------|-----------|----------|
| 80 | 1     | b               | Received TSN           | _ 1       |          |
|    |       |                 | Delivered to upper layer | N/A       |          |
| 82 | 2     | a               | Received TSN           | _ 1 _ _ 4 |          |
|    |       |                 | Delivered to upper layer | N/A       |          |
| 84 | 3     | b               | Received TSN           | _ 1 _ _ 4 | _ 1      |
|    |       |                 | Delivered to upper layer | N/A       |          |
| 86 | 3     | d               | Received TSN           | _ 1 _ _ 4 | _ 1 _ 3  |
|    |       |                 | Delivered to upper layer | N/A       |          |
| 88 | 5     | c               | Received TSN           | _ 1 _ 3 4 | _ 1 _ 3 4 5 |
|    |       |                 | Delivered to upper layer |           | 1 3 4 5  |
| 90 | 5     | d               | Received TSN           | _ 1 _ 3 4 5 |         |
|    |       |                 | Delivered to upper layer | 1         |          |
| 92 | 6     | b               | Received TSN           | _ 3 4 5 6 7 |         |
|    |       |                 | Delivered to upper layer | 3 4 5 6 7 |          |

Figure 8

|      | 100 | 102 | 104 | 106 | 108 | 110 |
|------|-----|-----|-----|-----|-----|-----|
| HARQ Process ID | Cycle 1 TSN, Status | Cycle 2 TSN, Status | Cycle 3 TSN, Status | Cycle 4 TSN, Status | Cycle 5 TSN, Status | Cycle 6 TSN, Status |
| a | B0, N | B0, N | A0, A | A4, A | B6, N:A | B10, A |
| b | B1, A | B4, N:A | A1, N:A | A5, A | B7, N | B7, A |
| c | B2, N | B2, A | A2, A |  | B8, A | B11, A |
| d | B3, A | B5, A:N | A3, A |  | B9, A | B12, A |

Figure 9

|     | Cycle | HARQ Process ID |  | Queue B | Queue A |
|-----|-------|------|------|---------|---------|
| 120 | 2 | d | Received TSN | 1 2 3 _ 5 |  |
|     |   |   | Delivered to upper layer | N/A |  |
| 122 | 3 | c | Received TSN |  | 0 _ 2 |
|     |   |   | Delivered to upper layer | 1 2 3 5 | 0 |
| 124 | 4 | b | Received TSN |  | _ 2 3 4 5 |
|     |   |   | Delivered to upper layer |  | 2 3 4 5 |
| 126 | 6 | b | Received TSN | _ 7 8 9 10 |  |
|     |   |   | Delivered to upper layer | 7 8 9 10 |  |
| 128 | 6 | d | Received TSN | 11 12 |  |
|     |   |   | Delivered to upper layer | 11 12 |  |

Figure 10

STALL AVOIDANCE SCHEMES USING HARQ PROCESS RECEIVING STATUS

CROSS REFERENCE APPLICATION

This application claims priority from U.S. Provisional Patent Application Nos. 60/353,389 filed on Feb. 1, 2002, 60/383,655 filed on May 28, 2002, and 60/390,969 filed on Jun. 24, 2002.

BACKGROUND

This invention relates to wireless communication. More particularly, this invention provides a fast missing gap removing mechanism for the HSDPA (High Speed Downlink Packet Access) process in a wireless communication system.

The HSDPA process provides in-sequence delivery of data blocks—MAC-hs PDUs to upper layer. It also supports priority handling by allowing different data priority classes in the same transport channel. At one end of the HSDPA, the UTRAN uses a scheduler to schedule for all connected UEs within a cell. The scheduler determines the HARQ Entity (one per UE) and the priority class buffers to be served and schedules new transmissions and retransmission where a new transmission can be initiated on an HARQ process at any time. The UTRAN uses the HARQ Entity to set the priority class identifier based on priority class of the buffer being serviced. Also the UTRAN uses Transmission Sequence Number (TSN) to track sending and receiving data blocks. It increments TSN for each new data block within the same HS-DSCH and priority class. Depending on the number bits used to represent a TSN, which has a finite range of values. For example, in a 6-bit TSN system, the TSN value is among 0-63, which has an initial value of 0. Of course, the range of TSN value will be used repeatedly during the process of transmission of a plurality of data blocks that may cause ambiguity in certain situations. Moreover, the HARQ also processes the status report from the UE, which includes ACK/NACK from the receiver and passes all status to the scheduler. Meantime, each data block associates with an out-band 3-bit HARQ process identifier and contains an in-band 4-bit priority class identifier. The HARQ process identifier indicates which HARQ process the data block should be sent to. The priority class identifier indicates which reordering buffer the data block belongs to.

The UE provides data blocks in-sequence delivery to higher layers by temporarily storing the correctly received data blocks in one of the reordering buffers based on the data block's TSN and priority class accordingly. Logically, one buffer per priority class is needed to provide in-sequence delivery per priority class. The received data blocks are delivered to higher layers in-sequence, when a data block with TSN=SN and all data blocks with TSN in the reordering buffer up to and including SN has been received correctly. However, when a data block of lower TSN is missing from the particular reordering buffer, all received data blocks with higher TSN are kept in the reordering buffer and can't be delivered to high layer. This is so called a stall situation.

Several conditions cause a data block missed during the transmission leading to the stall situation: (1) The transmitter receives a NACK, instead of an ACK returned by the receiver, for a sent data block. Thus the UTRAN discards the acknowledged data block from the retransmission buffer and starts afresh with a new data block in the HARQ process. Retransmission of the discarded data block is left up to higher layers. (2) The retransmission of a data block is interrupted because the number of retransmission is exceeded the maximum retry, then the transmitter has options of either to resume retransmission of the data block at a later time or to discard the interrupted data block. (3) If a CRC error happened to a data block during transmission in the HS-SCCH that is detected, the UE receives no data and sends no status report. Of course, when the absence of the status report is detected, the UTRAN can retransmit the data block. (4) A data block can not be correctly encoded at the receiver and a NACK is reported, which a retransmission is expected in this case.

Usually, the reordering buffer will receive the missing data block caused by the Case (3) and the Case (4) described above because most likely the transmitter will retransmit the missing data block to the receiver again. The reordering buffer can deliver the expected in-sequence delivery data blocks in the reordering buffer when all data blocks with lower SN have been received. However, a missing data block caused by the Cases (1) and (2) would be permanently lost and the receiver cannot or will not receive the missing data block in a foreseeable time.

But occasionally some MAC-hs PDUs are lost during transmission that will cause the missing gap(s) in the reordering buffers of the receiver. Meanwhile if the transmitter already discarded these lost PDUs from its transmitting buffer and would not send them again, the receiver can't deliver other already received MAC-hs PDUs in the reordering buffers to upper layer. This constitutes a stall situation.

To avoid the stall situation, the system uses either a timer-based mechanism or a window based mechanism or both of them to manage the reordering buffers in the reordering entity. However, the prior art mechanism is not a fault-proof one. Two problems of the prior art mechanism can be further illustrated in detail. First, because the system supports many different priorities of communication classes. A transmission of a lower priority of data block can be interrupted by a request to transmit data blocks of higher priority class. Only after data blocks of higher priority class are all successfully transmitted, the interrupted low priority data block can resume its re-transmitting through a reinitiation process. In general, this will not cause problems.

For instance, the interrupted data block TSN=3 might have been correctly received by the receiver and an ACK was reported by the receiver but the transmitter erroneously recognized ACK as a NACK (negatively acknowledgment). This will cause TSN ambiguity problem. If the re-initiated TSN=3 is received, the receiver can not distinguish it to be a retransmitted data block so that the reordering entity might wrongly recognize it as belonging to the next cycle of TSN space. If this does happen, data blocks will be delivered out of sequence, which is not allowed in HARQ protocol.

Second, because a missing gap in a reordering buffer of the receiver can be removed only after the receiving window is updated to a higher position, the prior art mechanism will degrade the system transmission latency. For example, in a 6-bit TSN system with setting the window size=32. If there is a missing gap at TSN=5, this gap can be removed only after TSN>=37 is received, i.e. received data blocks with TSN=6 up to 31 will be held in the reordering buffer until TSN >=37 is received.

Furthermore, to define this invention we should explain the difference between the pre-emption allowed or not allowed systems first. Although the systems support priority handling by allowing different data priority classes in the same transport channel, this is done by allowing the transmission of the lower priority MAC-hs PDUs be interrupted by the transmission of the higher priority MAC-hs PDUs. However, in the pre-emption not allowed systems the interrupted MAC-hs PDUs won't be re-initiated for transmission by the transmitter. In general, the pre-emption not allowed systems will take the advantage of HARQ protocol by delaying the interruption from any higher priority MAC-hs PDUs until the current transmitted MAC-hs PDU is positively acknowledged. On the other hand, by allowing the interrupted MAC-hs PDUs re-initiated for transmission by the transmitter, these systems are pre-emption allowed systems.

SUMMARY

This invention proposes a mechanism based on the receiving status of the HARQ processes to provide a more efficient stall avoidance mechanism.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompany drawings which are given by way of illustration only, and thus are not limitative of the present invention.

FIG. 1 illustrates a transmission example of HARQ processes in pre-emption not allowed case;

FIG. 2 illustrates how Rules 1 & 2 of this invention remove the missing gap(s) of the reordering buffer(s) based on the example of FIG. 1;

FIG. 3 illustrates a transmission example of HARQ processes with preemption allowed case;

FIG. 4 illustrates how Rules 3, 4 and 5 of this invention remove the missing gap(s) of the reordering buffer(s) based on the example of FIG. 3;

FIG. 5 illustrates a transmission example of HARQ processes with preemption not allowed case under Interleaving transmission scheduling;

FIG. 6 illustrates how Rules 7 & 9 of this invention remove the missing gap(s) of the reordering buffer(s) based on the example of FIG. 5.

FIG. 7 illustrates a transmission example of HARQ processes with pre-emption allowed case;

FIG. 8 illustrates how Rules 8 & 9 of this invention remove the missing gap(s) of the reordering buffer based on the example of FIG. 7.

FIG. 9 illustrates a transmission example of HARQ processes with pre-emption not allowed case;

FIG. 10 illustrates how Rule 7 of this invention remove the missing gap(s) of the reordering buffer based on the example of FIG. 9.

DETAIL DESCRIPTION OF THE INVENTION

One way for the receiver to monitor the receiving statues of data blocks in the HARQ process is to set up a soft buffer temporarily to store the received MAC-hs PDUs first. If the new received MAC-hs PDU contains new data in this HARQ process or this is the first received transmission in this HARQ process, the receiver shall replace the data currently in the soft buffer for this HARQ process with the received data. This invention uses the MAC-hs PDU's New Data Indicator field to indicate if the new MAC-hs PDU contains new data. This is done by having an incremented value in the New Data Indicator of the new PDU comparing to the New Data Indicator's value of the previous received MAC-hs PDU. On the other hand, if the MAC-hs PDU does not contain a new data nor it is the first received transmission in this HARQ process, the receiver shall combine the received data with the not successfully decoded data currently in the soft buffer for this HARQ process. Later, if the data in the soft buffer has been successfully decoded and no error was detected, the receiver delivers the decoded MAC-hs PDU to the reordering entity and generates a positive acknowledgement (ACK) for the receiving PDU in this HARQ process and sends the ACK back to the transmitter. Otherwise, the receiver should generate a negative acknowledgment (NAK) for the receiving PDU in this HARQ process and report it to the transmitter. Of course, if the New Data Indicator indicates the MAC-hs PDU is a resent data block and the HARQ process has decoded the data block successfully and cleared its soft buffer, the resent data block is discarded.

Next, the receiver's HARQ process processes its Queue ID contained in the received MAC-hs PDU and forwards the received MAC-hs PDU to the reordering queue distribution entity, which routes the MAC-hs PDU to the corresponding reordering buffer based on its Queue ID.

Moreover, this invention defines an HARQ process in the receiver into three states, X, Y and Z. First, the X state of a receiver's HARQ process is when the HARQ process receives a MAC-hs PDU successfully during the TTI. Second, the Y state of a receiver's HARQ process for a particular TTI is when three following conditions are satisfied: (1) either there was a MAC-hs PDU allocated in the previous TTI for this HARQ process or this TTI is the first TTI allocated for this HARQ process; (2) the New Data Indicator of the received MAC-hs PDU indicates that this PDU contains new data or this is the first received transmission for the HARQ process; and (3) within this particular TTI, the HARQ process does not receive a MAC-hs PDU successfully.

Third, an HARQ process of the receiver is in state Z for a particular TTI when the following three conditions meet: (1) either there was a MAC-hs PDU allocated in the previous TTI for this HARQ process or this TTI is the first TTI allocated for the HARQ process; (2) the New Data Indicator of the received MAC-hs PDU indicates the PDU contains new data in this HARQ process or this is the first received transmission in the HARQ process; and (3) within this particular TTI, the HARQ process receives a MAC-hs PDU successfully. By definition, an HARQ process in state Z is also in state X but not vice verse.

This invention deals with the pre-emption not allowed case first. Two new rules are proposed in the scheme: (Let n be the number of active HARQ processes of the HARQ entity in the UE.)

Rule 1: During n consecutive TTIs, if the states of these n active HARQ processes match one of the following patterns: a n consecutive X states, or a n consecutive Y states, or one or more consecutive X states at the beginning followed by one or more consecutive Y states, then the receiver shall discard all missing gaps in the reordering buffers of all queue IDs and deliver all correctly received MAC-hs PDUs in the corresponding reordering buffers to upper layer.

For example, in the n=4 case, the receiver will trigger Rule 1 when four consecutive states match any of the following patterns: XXXX, XXXY, XXYY, XYYY or YYYY.

For pre-emption not allowed case, when Rule 1 is triggered, any previous missed MAC-hs PDU will not be retransmitted again. And any new MAC-hs PDU with lower TSN shall be transmitted before the transmission of any new MAC-hs PDU with higher TSNs in this HARQ entity. Therefore, all the missing gaps in the reordering queues can be discarded when Rule 1 is triggered.

Rule 1 only covers few specific receiving patterns and does not cover when there is state X following state Y in the n consecutive states, e.g. XXYX or YXYY for the case of n=4, where the missing PDUs transmitted in the Y state before the X state may be retransmitted by the transmitter later. Hence, Rule 2 is proposed.

Rule 2: During n consecutive TTIs, if the states of these n active HARQ processes are mixed with either state X or state Y, and all states X after the first state Y are also state Z, this kind of receiving patterns should trigger Rule 2. At this point, the receiver shall discard all the missing gaps in the reordering buffers of all queue IDs except those that are detected as missing gaps by the MAC-hs PDUs received by the HARQ processes in state Z and deliver all in-sequence MAC-hs PDUs in the reordering buffers to upper layer.

Because the temporarily missing TSNs of the Y states before Z state may be retransmitted later and should not be discarded prematurely, the missing gaps detected by the received MAC-hs PDUs of the HARQ processes in state Z shall not be discarded in Rule 2.

To illustrate how Rules 1 and 2 work in the pre-emption not allowed case, refer to FIGS. 1 and 2. FIG. 1 illustrates a transmission example of HARQ processes in the pre-emption not allowed case. Assume that the UTRAN uses n active HARQ processes namely a, b, c, and d in cascade (n=4 in this example) for one HARQ entity. At the beginning, the system requests eleven MAC-hs PDUs of priority class B, B0 to B10 for transmission. In Cycle 1 10, the UTRAN sends class B MAC-hs PDUs B0, B1, B2, and B3 with TSN=0, 1, 2, 3, respectively. The receiver returns a NAK (negatively acknowledged) to the UTRAN for the erroneous B0 received. However, because of a transmission error, the UTRAN recognizes the NAK as an ACK. Status indication for B0 is represented as "N:A". Status indications for B1 and B3 are shown as "A", which means that the receiver receives B1 and B3 correctly and the UTRAN receives their corresponding ACKs correctly. Because a CRC error happened at HS-SCCH, the UTRAN sends B2 out and receives no acknowledgment for B2. The UTRAN treats this non-respond as a negatively acknowledged and the B2 status indication is represented as "–".

Next, according to the current HARQ technique, the UTRAN will retransmit the negatively acknowledged MAC-hs PDU on the same HARQ process. The UTRAN retransmits B2 and also transmits B4, B5 and B6 in Cycle 2 12. The receiver returns a NAK for receiving an erroneous B5 and the UTRAN receives the NAK correctly. Thus, the status indication for B5 is represented as "N". At Cycle 3 14, the UTRAN must transmit five MAC-hs PDUs A0-A4 of a higher priority class A. In Cycle 3, the UTRAN transmits A0 to A3, with TSN=0, 1, 2, 3 respectively. Status indication from the receiver for A2 is NAK but is mistakenly recognized as ACK by the UTRAN, and Status indications for A0 (NAK), A1 (ACK) and A3 (ACK) are correctly recognized by the UTRAN. In Cycle 4 16, the UTRAN retransmits A0 on process a and A4 on process b. In the same cycle, the UTRAN allocates HARQ processes c and d for other receiver so that they are not available to the particular receiver in this example. In Cycle 5 18, A0 and A4 are retransmitted. B7 and B8, which are never transmitted before, are transmitted in the cycle while the interrupted MAC-hs PDU B5 is not re-initiated and will not be retransmitted because pre-emption not allowed is assumed in this example. In cycle 6 20, B9, B10 and B7 are successfully transmitted and received.

At TTI of process b Cycle 3 22 of the FIG. 2, the previous 4 HARQ states are XXYX, which does not trigger Rule 1. The HARQ states can also be XXYZ, which triggers Rule 2. Upon receiving the MAC-hs PDU A1 by the receiver at TTI of process b in Cycle 3 22, the HARQ monitoring procedure detects a missing gap A0. However because A1 is received in a Z state, the procedure will not discard A0 at this point. The missing gaps B0 and B5 are discarded and B1, B2, B3, B4 and B6 are delivered to upper layer. At TTI of process c Cycle 6 24 of FIG. 2, the TTI-states are XXXX. Missing gap A2 is discarded and all the MAC-hs PDUs in the reordering buffers A and B are delivered to upper layer. Note that, at TTI of process c Cycle 2 12 of FIG. 1, the previous 4 HARQ states are XXYX and can not be marked as XXYZ because there is no MAC-hs PDU allocated for process c Cycle 1 so that neither Rule 1 nor Rule 2 is triggered.

Next, the pre-emption allowed system is considered, where the missing MAC-hs PDUs except the queue of highest priority may be re-initiated and transmitted. As Rules 1 and 2 are specifically designed for pre-emption not allowed case, Rules 3 and 4 are proposed to handle the pre-emption allowed case.

FIG. 3 shows a transmission example of HARQ processes in the preemption allowed case. The UTRAN schedules to transmit eight MAC-hs PDUs B0 to B7 of class B at Cycle 1 26 and six MAC-hs PDUs A0 to A5 of a higher priority class A at Cycle 3 30. In Cycle 1 26, B0, B1, B2 and B3 MAC-hs PDUs with TSN=0, 1, 2, 3 respectively are transmitted. The notation of Status is same as described for FIG. 1. In Cycle 2 28, the UTRAN sends B4, B5, B2 and B3. In Cycle 3 30, the request to transmit MAC-hs PDUs of a higher priority class A interrupts the transmission of class B MAC-hs PDUs, the UTRAN starts to transmit class A MAC-hs PDUs. After transmitting of all class A MAC-hs PDUs in Cycle 3, 4 and 5 30, 32 and 34, the UTRAN re-initiates and transmits B3 and B5 in Cycle 5 34, which have not been acknowledged yet before the interruption. The re-initiated MAC-hs PDUs such as B3 or B5 will be indicated as "new transmitted" by the New Data Indicator since they are not immediately retransmitted after their previous transmissions. The receiver will treat B3 and B5 as "new" and will not combine them with those data left in HARQ soft buffer if exist. In Cycle 6 36, B6, B7 and B3 are successfully transmitted and received.

Rule 3: During n consecutive TTIs, if the states of these n active HARQ processes satisfy one of the following patterns: a n consecutive Y states, or starting with one or more consecutive X states at the beginning followed by one or more consecutive Y states, then the receiver shall discard all missing gaps in the reordering buffer of the queue ID corresponding to the highest priority and deliver all correctly received MAC-hs PDUs in the reordering buffer of this queue ID to upper layer.

Rule 4: During n consecutive TTIs, if the states of these n active HARQ processes contain both state X and state Y, and all states X after the first state Y are also state Z, this condition triggers Rule 4. At this point, the receiver shall discard all the missing gaps in the reordering buffer of the queue ID corresponding to the highest priority except those that are detected as missing gaps by the MAC-hs PDUs received by the HARQ processes in state Z and deliver all in-sequence MAC-hs PDUs in the reordering buffer of this queue ID to upper layer.

One additional rule is proposed for the pre-emption allowed case:

Rule 5: Whenever all the states of the HARQ processes in n consecutive TTIs for these n active HARQ processes are X states, the receiver shall discard all missing gaps in the reordering buffers of the queue IDs with priority higher than or equal to the highest priority of the received MAC-hs PDUs in the n consecutive X states. The receiver shall deliver all the MAC-hs PDUs in the reordering buffers of these mentioned queue IDs to upper layer.

The state patterns triggering Rule 3 contain at least one state Y in them. There is also at least one state Y in the state pattern to trigger Rule 4. Since the unsuccessfully received PDU of the Y state does not provide the information of queue ID, Rule 3 and Rule 4 can only applied to the queue of highest priority in the pre-emption allowed case.

To illustrate how Rules 3, 4 and 5 work in the pre-emption allowed case, refer to FIG. 4 together with FIG. 3. At TTI of process a Cycle 4 40, the previous 4 HARQ states are XYXY, which does not trigger Rule 3. The 4 HARQ states can also be XYZY, which triggers Rule 4. When the receiver receives the MAC-hs PDU A3 at TTI of process d Cycle 3 (state Z), the reordering buffer detects the missing gap A2, which is not discarded according to Rule 4. At this point 40, the missing gap A0 is discarded and A1 is delivered to upper layer. At TTI of process c Cycle 6 42, the HARQ state pattern is XXXX with priority B MAC-hs PDUs received. Rule 5 is triggered. Thus, missing gaps B0 and A2 are discarded and all the MAC-hs PDUs in reordering buffers A and B are delivered to upper layer.

Rules 1 to 5 work under the assumption that the scheduler at the UTRAN schedules data transmission to each receiver by a set of 2n or more MAC-hs PDUs. However, the transmitter may use interleaving transmission among UEs, i.e., the transmitter sends one PDU to each UE in turns. Under this interleaving transmission situation, the receiving state patterns triggering Rules 1-5 will happen rarely. Therefore, Rule 6, an additional mechanism based on the receiving status of the soft buffer, is proposed:

Rule 6: When the receiver successfully receives a higher TSN MAC-hs PDU and detects one or more lower TSN MAC-hs PDUs missing from the reordering buffer, the receiver marks the missing gap(s) and the HARQ entity begins to monitor the HARQ process receiving status. Meantime, the HARQ monitoring procedure starts to track all the HARQ processes in this HARQ entity except the HARQ process that just successfully received the last MAC-hs PDU that invoked the detection and the marking of missing gaps. During the monitoring period, if the soft buffer of each monitored HARQ processes in the HARQ entity is cleared at least once because each soft buffer successfully receives a MAC-hs PDU of the same Queue ID (the same reordering buffer) as the marked gap(s) has, the receiver shall discard still missing gaps among the marked gap(s) and deliver all in-sequence MAC-hs PDUs in the reordering buffers of this queue ID to the upper layer. New missing gaps, if any, detected during the monitoring duration shall not be removed.

The state pattern triggering Rule 6 does not require the X states to be consecutive as the state patterns of Rules 1 and 5 do. Actually, the monitored soft buffer can be cleared either when the soft buffer successfully receives a MAC-hs PDU of the same Queue ID (the same reordering buffer) as the marked gap(s) has, or the New Data Indicator of the received MAC-hs PDU indicates the PDU has new data. Of course, both conditions of the buffer clearance can be combined as in Rule 6A.

Rule 6A: When the receiver successfully receives a higher TSN MAC-hs PDU and detects one or more lower TSN MAC-hs PDUs missing from the reordering buffer, the receiver marks the missing gap(s) and the HARQ entity begins to monitor the HARQ process receiving status. Meantime, the HARQ monitoring procedure starts to track all the HARQ processes in this HARQ entity except the HARQ process that just successfully received the last MAC-hs PDU that invoked the detection and the marking of missing gaps. During the monitoring period, if the soft buffer of each monitored HARQ processes in the HARQ entity is cleared at least once either because the soft buffer successfully receives a MAC-hs PDU of the same Queue ID (the same reordering buffer) as the marked gap(s) has, or because the New Data Indicator showed that the incoming MAC-hs PDU contains a new data in the soft buffer, then the receiver shall discard still missing gaps among the marked gap(s) and deliver all in-sequence MAC-hs PDUs in the reordering buffers of this queue ID to the upper layer. New missing gaps, if any, detected during the monitoring duration shall not be removed.

To deal with the situation that the receiver may miss a data block because of a CRC error on the HS-SCCCH channel, where the outband signals are carried, the missing gap removing is triggered after the second occasion of the soft buffer clearance caused by the receiving a New Data Indicator showing that the incoming MAC-hs PDU contains new data. This special treatment perfectly works for the pre-emption not allowed case. On the other hand, it increases the robustness of Rule 6A for the pre-emption allowed case. This is summarized in Rule 6B.

Rule 6B: When the receiver successfully receives a higher TSN MAC-hs PDU and detects one or more lower TSN MAC-hs PDUs missing from the reordering buffer, the receiver marks the missing gap(s) and the HARQ entity begins to monitor the HARQ process receiving status. Meantime, the HARQ monitoring procedure starts to track all the HARQ processes in this HARQ entity except the HARQ process that just successfully received the last MAC-hs PDU that invoked the detection and the marking of missing gaps. During the monitoring period, if the soft buffer of each monitored HARQ processes in the HARQ entity is cleared either at least once because the soft buffer successfully receives a MAC-hs PDU of the same Queue ID (the same reordering buffer) as the marked gap(s) has, or at least twice because the New Data Indicator shows that the incoming MAC-hs PDU contains a new data, then the receiver shall discard still missing gaps among the marked gap(s) and deliver all in-sequence MAC-hs PDUs in the reordering buffers of this queue ID to the upper layer. New missing gaps, if any, detected during the monitoring duration shall not be removed.

Rules 6, 6A and 6B are general rules that can be applied to the systems with either pre-emption allowed or not allowed. In fact, Rule 6 can be implemented whether the system supports different data priority transmission or not. In the current HSDPA, Rules 6, 6A and 6B can be modified to support the priority property in a pre-emption allowed system. Nevertheless, this invention further tailors Rules 6, 6A and 6B into Rules 7, 7A and 8 based on whether pre-emption allowed or not.

For the pre-emption not allowed case, Rule 7 and Rule 7A are proposed:

Rule 7: When the receiver successfully receives a higher TSN MAC-hs PDU and detects one or more lower TSN MAC-hs PDUs missing from the reordering buffer, the receiver marks the missing gap(s) and the HARQ entity begins to monitor the receiving status of all the HARQ processes in this HARQ entity except the HARQ process that just successfully received the last MAC-hs PDU that invoked the detection and the marking of missing gaps. During the monitoring period, if the soft buffer of each monitored HARQ processes in the HARQ entity is cleared at least once either because each monitored soft buffer successfully receives a MAC-hs PDU of any Queue ID or because the New Data Indicator shows that the incoming MAC-hs PDU contains a new data, the receiver shall discard existing missing gaps among the marked gaps and deliver all in-sequence MAC-hs PDUs in the reordering buffers of this queue ID.

Rule 7A: When the receiver successfully receives a higher TSN MAC-hs PDU and detects one or more lower TSN MAC-hs PDUs missing from the reordering buffer, the receiver marks the missing gap(s) and the HARQ entity begins to monitor the receiving status of all the HARQ processes in this HARQ entity except the HARQ process that just successfully received the last MAC-hs PDU that invoked the detection and the marking of missing gaps. During the monitoring period, if the soft buffer of each monitored HARQ processes in the HARQ entity is cleared either at least once because each monitored soft buffer successfully receives a MAC-hs PDU of any Queue ID, or at least twice because the New Data Indicator shows that the incoming MAC-hs PDU contains a new data, the receiver shall discard existing missing gaps among the marked gaps and deliver all in-sequence MAC-hs PDUs in the reordering buffers of this queue ID.

For the pre-emption allowed case, Rule 8 is proposed:

Rule 8: When the receiver successfully receives a higher TSN MAC-hs PDU and detects one or more missing lower TSN MAC-hs PDUs missing from the reordering buffer, the receiver marks the missing gap(s) and the HARQ entity begins to monitor the HARQ process receiving status. Meantime, the HARQ monitoring procedure starts to track all the HARQ processes in this HARQ entity except the HARQ process that just successfully received the last MAC-hs PDU that invoked the detection and the marking of missing gaps. During the monitoring period, if the soft buffer of each monitored HARQ processes in the HARQ entity is cleared at least once because each monitored soft buffer successfully receives a MAC-hs PDU of the Queue ID corresponding to priority class lower than or equal to the marked gaps. At this point, the receiver shall discard still missing gaps among the marked gaps and deliver all in-sequence MAC-hs PDUs in the reordering buffers of this queue ID.

New missing gaps, if any, detected during the monitoring period of Rules 7, 7A and 8 shall not be removed. Rule 9 below is designed to handle multiple gaps marking and Rule 9 can be applied together with Rules 6, 6A, 6B, 7, 7A and 8.

Rule 9: During a HARQ monitoring period triggered by a gap marking, if any new gap is detected in the same or different Queue ID, a separate HARQ monitoring procedure is triggered and starts to track and mark the new gap(s). If the soft buffers are cleared as described by Rules 6, 6A, 6B, 7, 7A and 8 respectively after marking of the new gap(s), the receiver shall discard the newly marked gap(s) and, of course, the previously marked gap(s) and deliver all in-sequence MAC-hs PDUs in the reordering buffers.

Finally, Rules 6, 6A, 6B, 7, 7A, 8 and 9 can also work to the systems either with interleaving transmission scheduling or not.

To illustrate how Rules 7 and 9 works in the pre-emption not allowed case, refer to FIG. 5. At Cycle 1 44, the UTRAN transmits B0 and B1. The receiver returns a NAK (negatively acknowledged) to the UTRAN for the erroneous B0 received. However, because of a transmission error, the UTRAN recognizes the NAK as an ACK. The status indication for B0 is represented as "N:A". The status indication for Bi is shown as "N" because the UTRAN received an negative acknowledgement from the receiver. At Cycle 3 48, the UTRAN transmits B2 successfully but fails for B1 again. At Cycle 4 50, B1 is transmitted successfully but not B4, meantime, B3 is falsely acknowledged. At Cycle 5 52, B4 and B5 are both successfully transmitted. Finally At Cycle 6, A0 and A1 are successfully transmitted. Refer to FIG. 6 together with FIG. 5, at TTI of process a Cycle 3 56, the HARQ monitoring procedure detects B0 and B1 are missing. The receiver marks them as the $1^{st}$ mark and monitors the HARQ processes b, c and d. At TTI of process c Cycle 5 58, upon the successfully received B5, the HARQ monitoring procedure detects B3 and B4 are missing and marks them as the $2^{nd}$ mark and monitors the HARQ processes a, b and d. Meantime, at TTI of process d Cycle 5 60, the condition of the soft buffer clearance for $1^{st}$ mark is fulfilled, the remaining gap B0 in the $1^{st}$ mark is discarded and B1 and B2 are delivered to upper layer. However, The gap B3 in the $2^{nd}$ mark is not discarded at this point. At TTI of process b Cycle 6 62, the condition of the soft buffer clearance for $2^{nd}$ mark is fulfilled, the remaining gap B3 in the $2^{nd}$ mark is discarded and B4 and B5 are delivered to upper layer. There is no gap in reordering buffers A so that A0 and A1 are delivered to upper layer also.

To illustrate how Rules 8 and Rules 9 work in the pre-emption allowed case, refer to FIG. 7. AT Cycle 1 64, B0 is falsely acknowledged while B1 is successfully transmitted and B2 and B3 are negatively acknowledged. At Cycle 2 66, B4 are successfully transmitted while B2 is falsely acknowledged and B3 and B5 are negatively acknowledged. At Cycle 3 68, A1 and A3 are successfully transmitted but A0 and A2 are falsely acknowledged. At Cycle 4 70, A4 and A5 are negatively acknowledged. At Cycle 5 72, A4, A5, B3 and B5 are all successfully received. At the Cycle 6 74, B6 and B7 are successfully received by the receiver. Refer to FIG. 8 together with FIG. 7, at TTI of process b Cycle 1 80, upon receiving B1, the HARQ monitoring procedure detects B0 missing, marks it and monitors the HARQ processes a, c and d for soft buffer clearance by successfully received MAC-hs PDUs of the reordering buffer B or lower priority buffers. At TTI of process a Cycle 2 82, the HARQ monitoring process detects new gap B2 and B3. The receiver marks them as the $2^{nd}$ mark and monitors the HARQ processes b, c and d for soft buffer clearance by successfully received MAC-hs PDUs of the reordering buffer B or lower priority reordering buffers. At TTI of process b Cycle 3 84, the HARQ monitoring procedure detects A0 is missing. The receiver marks it as the $3^{rd}$ mark and starts another monitoring procedure to monitor the HARQ processes a, c and d for soft buffer clearance by successfully received MAC-hs PDUs of the reordering buffer A or lower priority buffers. At TTI of process d Cycle 3 86, the HARQ monitoring procedure detects A2 is missing. The receiver marks it as the $4^{th}$ mark and monitors the HARQ processes b, c and d for soft buffer clearance by successfully received MAC-hs PDUs of the reordering buffer A or lower priority buffers. At TTI of process c Cycle 5 88, both the soft buffers clearance for $3^{rd}$ and $4^{th}$ marks are fulfilled. The gaps A0 and A2 are discarded. At TTI of process d Cycle 5 90, soft buffer clearance for $1^{st}$ mark is fulfilled. The gap B0 is discarded. At TTI of process b Cycle 6 92, soft buffer clearance for $2^{nd}$ mark is fulfilled. The gap of B2 is discarded. In this example, the advantage of Rule 9 is obvious.

FIG. 9 together with FIG. 10 illustrates how Rule 7 works in the pre-emption not allowed case. FIG. 9 illustrates another transmission example of HARQ processes in the pre-emption not allowed case. The UTRAN uses 4 active HARQ processes namely a, b, c, and d in cascade for one HARQ entity. At the beginning, the system requests thirteen MAC-hs PDUs of priority class B, B0 to B12 for transmission. In Cycle 1 100, the UTRAN sends class B MAC-hs PDUs B0, B1, B2, and B3 with TSN=0, 1, 2, 3, respectively. B1 and B3 are transmitted successfully and B0 and B2 are not. In Cycle 2 102, B0, B4, B2 and B5 are transmitted. The receiver returns a NAK to the UTRAN for the erroneous B4 received. However, because of a transmission error, the UTRAN recognizes the NAK as an ACK. Status indication for B4 is represented as "N:A". B5 is received correctly by the receiver. However, the ACK sent by the receiver is recognized as NAK due to transmission error. At the beginning of Cycle 3 104, the UTRAN must transmit six MAC-hs PDUs A0-A5 of a higher priority class A. In Cycle 3 104, the UTRAN transmits A0 to A3, with TSN=0, 1, 2, 3 respectively. Status indication from the receiver for A1 is NAK but is mistakenly recognized as ACK by the UTRAN. In Cycle 4 106, the UTRAN transmits A4 and A5 successfully on processes a and b respectively. In the same cycle, the UTRAN allocates HARQ processes c and d for other receiver so that they are not available to the particular receiver in this example. In Cycle 5 108, the transmitter resume to transmit MAC-hs PDUs of priority class B, B6 to B9. Note that the interrupted MAC-hs PDUs B0 and B5 are not re-initiated for retransmission because pre-emption not allowed is assumed in this example. In cycle 6 110, B10, B7, B11 and B12 are successfully transmitted and received.

At TTI of process d Cycle 2 120 of FIG. 10, B0 and B4 have been marked as missing gap. At TTI of process c Cycle 3 122, all the monitored HARQ processes a, b and c are indicated to be cleared for new data so that Rule 7 is triggered to remove the missing gaps B0 and B4 and to deliver all the in sequence MAC-hs PDUs B1, B2, B3 and B5 to the upper layer. Meantime, upon receiving the MAC-hs PDU A2 by the receiver at TTI of process c in Cycle 3 122, A1 is marked as a missing gap and the monitoring procedure begins. At TTI of process b Cycle 4 124 of FIG. 10, each of the monitored HARQ processes has been cleared once because of receiving an MAC-hs PDU correctly. Missing gap A1 is discarded and all the insequence MAC-hs PDUs in the reordering buffers A, A0 and A2 to A5, are delivered to upper layer. At TTI of process b Cycle 6 126, Rule 7 is triggered again to discard the missing gap B6, and deliver B7 to B10 to upper layer. Finally, at TTI of process d Cycle 6 128, no gap is detected and all the received MAC-hs PDUs, B11 and B12, are delivered to upper layer.

Depending on whether the system allowing pre-emption or not, supporting data priority delivery or not, or using interleaving transmission or not, Rules 1-9 of this invention provide mechanisms to cover different situations that help to avoid the potential stall problem and increase the system performance.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method to avoid stall of data blocks in-sequence delivery of reordering buffers at a receiver in a high speed wireless communication system, the method comprising:
    at a transmitter:
    using hybrid automatic repeat request (HARQ);
    assigning a Transmission Sequence Number (TSN) to each sending data block sequentially and supporting transmission priority handling by allowing different data priority classes in a transport channel; and
    delaying the interruption from any higher transmission priority data blocks until a currently transmitted lower transmission priority data block is positively acknowledged.

* * * * *